Dec. 7, 1965 A. Z. PURZYCKI 3,222,008

REEL ACCELERATOR AND BRAKE MECHANISM

Filed May 16, 1963

INVENTOR
ALFRED Z. PURZYCKI

BY J. D. Hamill

ATTORNEY

United States Patent Office 3,222,008

Patented Dec. 7, 1965

3,222,008

REEL ACCELERATOR AND BRAKE MECHANISM

Alfred Z. Purzycki, Mount Prospect, Ill., assignor to Teletype Corporation, Skokie, Ill., a corporation of Delaware Filed May 16, 1963, Ser. No. 280,821
6 Claims. (Cl. 242—75.43)

This invention relates to a reel mechanism having a freely rotatable reel with a coil of tape thereon and more particularly to an accelerating mechanism for accelerating the reel and coil of tape from a rest position and to a braking mechanism for stopping a continued rotation of the reel and unwinding of tape due to the inertia of the tape reel.

An object of the invention is to provide a combined mechanism operable to accelerate a tape reel and coil of tape when a tape utilization device exerts a pulling force on the tape and to brake the reel of tape and coil of tape against further rotation due to their combined inertia when the tape utilization device no longer exerts a pulling force on the leading end of the tape.

According to the preferred embodiment of the invention, a tape reel bearing a coil of tape is mounted on a supporting axle on a tape stand. The leading end of the coil of tape is passed through a bearing on a tape guiding arm rotatably mounted on the axle of the tape stand and the tape is passed through the bearing to a tape utilization device such as a tape reader or tape punch. The tape guiding arm is biased by a spring to a first position where an arm of a bell crank pivoted on the tape guiding arm is in frictional engagement with a grooved disc secured to the tape reel. When the tape utilization device pulls the tape, the tape guiding arm will swing in the direction of the tape movement and bring a second arm of the bell crank into engagement with the grooved disc thereby effectively locking together the tape reel and the arm so that the leverage exerted to accelerate the tape reel and coil of tape extends from the bearing on the tape arm to the center of the reel. With this increased leverage the large mass of the tape reel can be more easily accelerated to the desired speed. When the tape reel has been accelerated up to speed, the tape reel and coil of tape will begin to move the grooved disc relative to the accelerating arm of the bell crank which then only lightly bears against the grooved disc under light spring pressure. The function of the tape guiding arm is to compensate for variations in tautness of the tape as it is moved through the tape utilization device and consequently, the tape arm fluctuates in both the first and second direction to maintain the tape taut between the tape reel and the tape utilization device. However, when the tape utilization device no longer is demanding tape, i.e., pulling tape therethrough, the tape will become slack and the tape guiding arm will rotate under the influence of a spring to bring the braking arm of the bell crank into engagement with a fixed stop, which stop cams the bell crank into engagement with the grooved disc to brake further revolutions of the tape reel and coil of tape due to their inertia.

Figure 2:
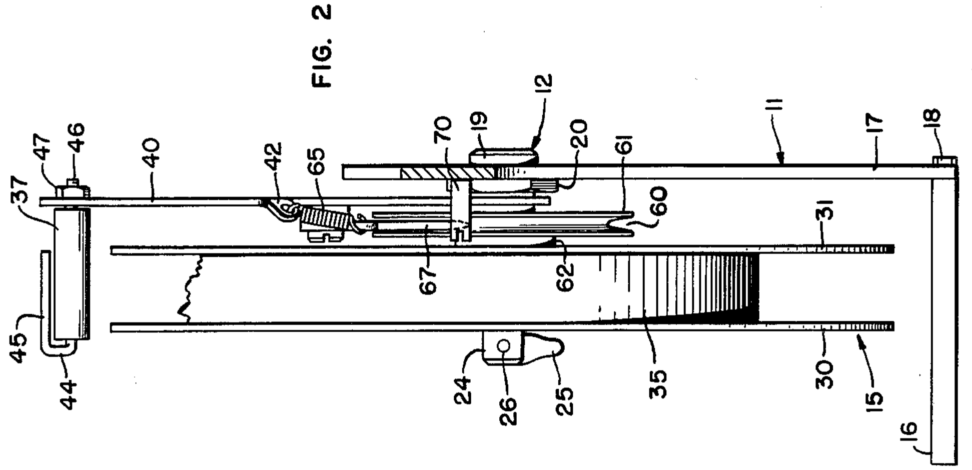
Figure 1:
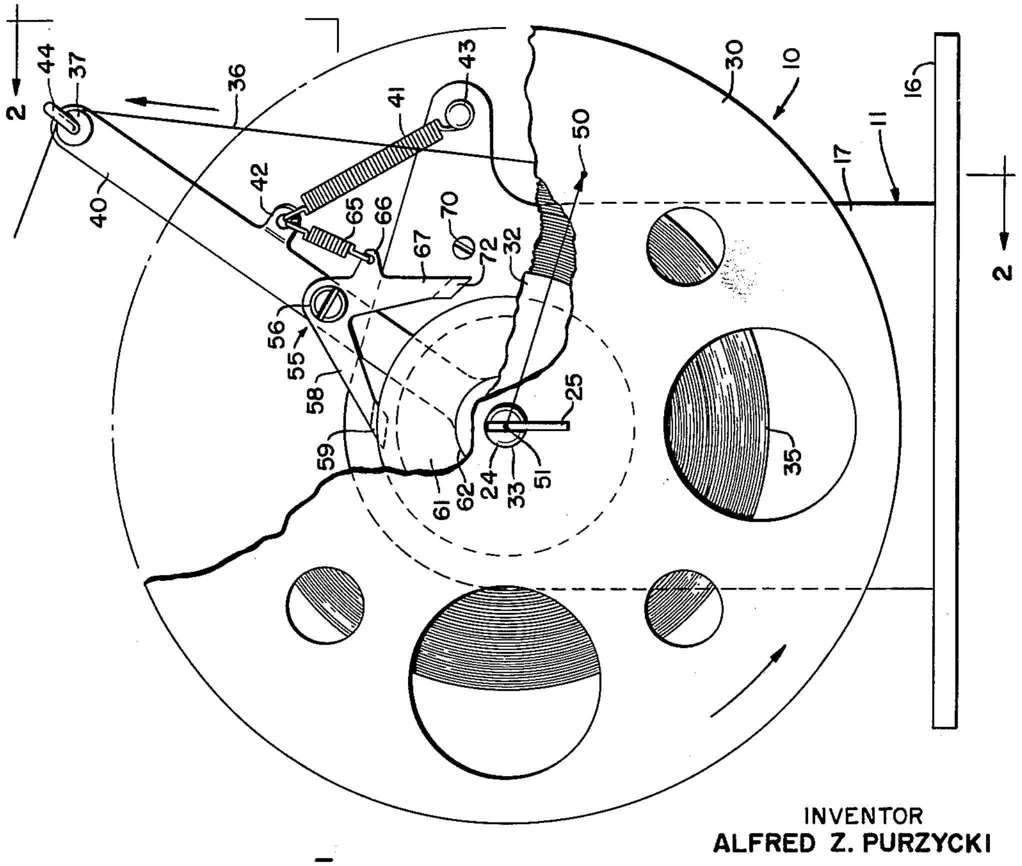

These and other objects will become apparent when considered in conjunction with the accompanying drawings wherein:

FIG. 1 is a front view of the reel with a flange partially broken away to show the tape accelerating and decelerating bell crank pivotally mounted on a tape guiding arm according to the preferred embodiment of the invention, and FIG. 2 is a partial sectional view taken along the line 2—2 in FIG. 1 in the direction of the arrows and showing the accelerating and braking mechanism according to the preferred embodiment of the invention.

Referring now to the sheet of drawing there is illustrated a tape reel mechanism 10 consisting generally of a tape stand 11 having a fixed axle 12 upon which is rotatably mounted a tape reel 15.

The tape stand 11 comprises a supporting base 16 to which an upstanding plate 17 is secured by suitable fasteners 18. The fixed axle 12 has an enlarged head 19 in engagement with the right side of the plate 17, as seen in FIG. 2, and its shank is threaded near the head 19 to receive a lock nut 20 placed on the left side of the plate 17. Upon turning the lock nut 20 on the threaded portion of the axle 12, the lock nut 20 may bear tightly against the plate 17 to frictionally secure the axle 12 to the upstanding plate 17.

As seen in FIG. 2 the leftwardly extending axle 12 terminates in a shaft portion 24 which is slotted at its end to receive a pivotal locking tab 25 therein. The locking tab 25 is pivotally mounted on a pin 26 secured within the shaft 24. With the locking tab 25 in the position shown in the drawing, the tape reel 15 is prevented from moving axially (leftwardly in FIG. 2). When it is desired to remove the tape reel 15 from the axle 12, the locking tab 25 is pivoted clockwise for 90° until it is aligned with the shaft 24 whereby the tape reel 15 may be moved axially leftwardly (FIG. 2) from the axle 12.

The tape reel 15 consists essentially of a pair of flanges 30 and 31 and a central hub 32 which has an inner bore 33 that rotates about the shaft portion 24 of the axle 12. The innermost turn of the coil of tape 35 can be secured to the hub in a conventional manner and the tape is wound in successive convolutions about the hub 32 to form a coil of tape 35, the outer turn of which, has its leading end 36 entrained over a rotatable bearing 37 carried on a tape guiding arm 40.

The leading end 36 of the coil of tape 35 extends from the bearing 37 on the tape guide arm 42 to the usual type of tape utilization device such as a tape reader or a tape punch (not shown). The tape guiding arm 40 is rotatably mounted on the fixed axle 12 for rotational movement independent of the tape reel 15. The tape guiding arm 40 is biased in a clockwise direction as seen in FIG. 1 by a contractile spring 41 secured between a perforated projection 42 on the tape guiding arm 40 and a post 43 on the upstanding plate 17. The bearing 37 is rotatably mounted on a bent wire guide 44 which has its upper portion 45 bent parallel to the axis of the bearing 37 so as to guide the tape over the bearing 37. An opposite end 46 of the bent wire guide 44 is threaded to receive a machine screw 47 for holding the bent wire guide 44 on the tape guiding arm 40.

As will be understood by those skilled in the art, the tape guide arm 40 is often called a taut-tape arm in that as the tape utilization device fluctuates in its pulling force due to an intermittent feeding of the tape through the tape utilization device, the tape arm 40 will rotate against the urging of its spring 41 to compensate for these fluctuations in the pulling force on the tape. For example, when the tape reel 15 is at rest and the tape utilization device feeds a portion of the tape forward, a sudden pull or attempted feeding movement would break the leading end 36 of the tape if it were not for the fact that the tape guiding arm 40 will rotate in a counterclockwise direction as seen in FIG. 1 to give some tape normally stored in an outward loop. Thus, a tape utilization device will initially be taking in tape stored in a loop at the leading end 36 of the tape until the tape reel 15 begins to start rotating. This pull on the leading end 36 of the tape exerts a force on the tape reel 15 at the point of tangency 50 with the coil of tape 35 and thus begins to rotate the tape reel 15 about the fixed shaft 24. The force applied by the leading end 36 of the tape at the tangential point 50 may be considered as acting through a lever arm the length of which arm is the distance between the point of tangency 50 and the center 51 of the tape reel. Thus, as the radius of the coil 35 of tape is continually diminished from that of a full roll of tape, the lever arm will continually become shortened and a point is reached, when employing large tape reels 15, where the leading end 36 of the tape is not able to exert sufficient force through this small distance to turn the reel 15 without breaking the tape and tearing out the feed holes in the tape of the tape utilization device.

It is the function of a combined braking and accelerating bell crank 55 that is pivotally mounted on a pivot pin 56 to increase the lever arm through which the turning force is applied from the distance between the tangential point 50 and the center 51 to the distance between the center of the bearing 37 and the center 51 of the tape reel 15. With this longer lever arm, a mechanical advantage is secured and hence less force is needed when acting through this longer distance to rotate the tape reel 15 up to speed.

The bell crank 55 has an accelerating arm 58 that terminates in a beveled end portion 59 adapted for engagement within a groove 60 (FIG. 2) on a grooved disc 61. A spacer disc 62 on the grooved disc 61 has axial projections (not shown) for insertion in a hole (also not shown) in the reel flange 31 to lock the grooved disc 61 and reel 15 together. Thus, as the beveled end portion 59 of the accelerating arm 58 of the bell crank 55 moves into engagement with the groove 60 on the disc 61 and the tape arm 40 is rotated in a counterclockwise direction as seen in FIG. 1 by the pull being exerted thereon by the tape extending from the tape utilization device, the beveled end portion 59 of the accelerating arm 58 will wedge within the groove 60 and the arm 40 will be prevented from rotating relative to the disc 61 and tape reel 15. The accelerating arm 58 and grooved disc 61 thus function as a one-way clutch in that the accelerating arm 58 and reel 15 are clutched together when the reel 15 is being accelerated to its operating speed and in that the accelerating arm 58 and reel 15 can turn independently of one another when the accelerating arm 58 rotates in the opposite or counterclockwise direction (FIG. 1).

When the tape exerts a pull on the tape guiding arm 40 at the bearing 37, the lever arm for turning the tape reel 15 will extend from the axis of this bearing 37 to the center 51 of the tape reel 15. With the increased mechanical advantage of a longer lever arm, less force is needed to accelerate the tape reel 15 up to its normal operating speed. It should be noted that the bell crank 55 is normally urged to present its beveled end portion 59 into the groove 60 by a light contractile spring 65 extending between the projection 42 on the tape guiding arm 40 and a hook 66 on the brake arm 67 of the bell crank 55.

As its name implies the brake arm 67 of the bell crank 55 functions as a brake to stop the rotation of the tape reel 15 due to its inertia whenever the tape utilization device no longer is pulling tape from the tape reel. For instance, when the tape utilization device no longer is pulling tape from the tape reel 15, the tape guiding arm 40 is urged by contractile spring 41 to rotate in a clockwise direction, as seen in FIG. 1, and to bring the brake arm 67 into engagement with a stop pin 70 mounted on the upstanding plate 17 and tape stand 11. Since the spring 41 is of greater strength than the spring 65, tape guiding arm 40 will continue to move in a clockwise direction and the pin 70 will cam the brake arm 67 clockwise and move its beveled end portion 72 into frictional braking engagement within the groove 60 of the disc 61. Since the disc 61 is fixedly connected to the tape reel 15 by the disc 62, the brake arm 67 exerts a frictional drag tending to brake and stop the tape reel 15 from further rotation. The pin 70 is preferably an eccentrically mounted pin so that it can be turned to a suitable position to cause the brake arm 67 to assume a correct position for the desired amount of braking force as the tape guiding arm 40 brings the brake arm 67 into engagement with the grooved disc 61. To aid in a better understanding of the principal operation of the accelerating device and the braking device for a tape reel, a brief description of operation will be given hereinafter.

When the tape reel 15 is at rest and the tape utilization device begins to exert a pulling force on the leading end of the tape 36, the leading end of the tape 36 acting through its right angle bend over the bearing 37 on the tape arm 40 causes the tape guiding arm 40 to pivot in a counterclockwise direction (FIG. 1) against the urging of its spring 41. As the tape guiding arm 40 pivots in a counterclockwise direction the braking arm 67 of bell crank 55 is moving away from the pin 70 thereby permitting the contractile spring 65 to pivot the bell crank 55 in a counterclockwise direction (FIG. 1) to bring the beveled end portion 59 of the accelerating arm 58 of the bell crank 55 into wedging engagement within the groove 60 on the disc 61 that is secured to the tape reel 15.

Whereas without the accelerating arm 58, the lever arm for turning the tape reel 15 would have been from the point of tangency 50 to the center 51 of the tape reel 15, the lever arm now is larger and extends between the center of the bearing 37 and the center 51 of the tape reel 15. Thus, less force is needed to initially start rotation of the reel of tape. This is particularly useful when the roll of tape is substantially diminished and the lever arm between the point of tangency 50 and center 51 is small while the inertia due to the large flanges 30 and 31 of the tape reel 15 is relatively quite large.

When the tape reel 15 is rotating as fast or faster than the tape is being needed, the grooved disc 61 will be sliding relative to the beveled end portion 59 and the accelerating arm 58 will be lightly dragging within the groove 60.

When the tape utilization device stops demanding tape, the tape reel 15 will due to its inertia continue to rotate and the leading end of the tape 36 will become slack. Whereupon the spring 41 rotates the tape guiding arm 40 in the clockwise direction as seen in FIG. 1 to bring the brake arm 67 into engagement with the pin 70 so that further clockwise rotation of the tape guiding arm 40 causes the beveled end portion 72 of the brake arm 67 to move into braking engagement within the groove 60 on the disc 61. The frictional drag imparted by the brake arm 67 quickly brings the tape reel 15 and disc 61 to a stop position whereas in the absence of the brake arm 67, the tape reel 15 would have continued to rotate due to the combined inertia of the coil of tape 35 and the flanges 30 and 31.

From the foregoing it should be apparent that the present device provides a simple attachment for mounting on a pivotal tape guiding arm for causing the acceleration of a tape and likewise the braking of the tape reel in response to a taut or slack condition in the tape being supplied to a tape utilization device.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. In a tape reel mechanism having a freely rotatable reel supporting a coil of tape thereon and wherein the leading end of the tape is pulled from the coil of tape by an external force to cause the coil of tape and the tape reel to rotate and the tape to unwind the combination comprising;

(a) a tape guiding means pivotally mounted on said tape reel mechanism for rotation in one direction by the leading end of the tape as the tape is pulled from the tape reel, (b) biasing means urging said tape guiding means in an opposite direction from said one direction, and (c) a one-way clutch means including a grooved disc fixed to said tape reel and a pawl means pivotally mounted on said tape guiding means for movement by said tape guiding means in said one direction to clutch together said tape reel and the tape guiding means to cause said tape guiding means to act as a lever arm for rotating said coil of tape and said reel.

2. In a tape reel mechanism having a freely rotatable reel supporting a coil of tape thereon and wherein the leading end of the tape is pulled from the coil of tape by an external force to cause the coil of tape and the tape reel to rotate and the tape to unwind the combination comprising;

(a) a tape guiding means pivotally mounted on said tape reel mechanism for rotation in one direction by the leading end of the tape as the tape is pulled from the tape reel, (b) biasing means urging said tape guiding means in an opposite direction from said one direction, and (c) a combined braking and clutching means actuated by movement of said tape guiding means in said one direction to clutch together the said tape guiding means and the reel and actuated by movement of the tape guiding means in the opposite direction to brake rotation of the reel.

3. The tape reel mechanism of claim 2 wherein said combined braking and clutching means comprises a grooved disc fixed to the reel and a bell crank pivotally mounted on said tape guiding means, movement of the tape guiding means in the one direction bringing a first arm of the bell crank into wedging engagement with the grooved disc during an acceleration of the reel and coil of tape thereon, said bell crank having the opposite arm adapted to engage the grooved disc fractionally and to brake the rotation of reel having the coil of tape thereon in response to movement of said tape guiding means in the opposite direction.

4. In a tape reel mechanism having a freely rotatable reel supporting a coil of tape thereon and wherein the leading end of the tape is pulled from the coil of tape by an external force to cause the coil of tape and the tape reel to rotate and the tape to unwind, the combination comprising;

(a) a taut-tape means pivotally mounted on said tape reel mechanism for rotation independently of said reel, rotational movement of said taut-tape means in one direction by the leading end of the tape as the tape is pulled from the tape reel, (b) biasing means urging said taut-tape means in an opposite direction from said one direction, (c) a braking and accelerating lever means pivotally mounted on said taut-tape means for rotation with said taut-tape means, (d) means on said reel for cooperating with said braking and accelerating means carried by said taut-tape means, (e) biasing means for urging said braking and accelerating means to a position wherein said means is effective to cause acceleration of the reel, and (f) stationary means carried by said tape reel mechanism for actuating said accelerating and braking means to brake the reel against further rotation due to the movement of the taut-tape means in an opposite direction.

5. In a tape reel mechanism having a freely rotatable reel carrying a coil of tape thereon, the leading end of tape being pulled from the coil of tape by a tape utilization device and causing the coil of tape to rotate by applying a force at the juncture of the leading end of the tape and the coil of tape, (a) a tape arm means pivotally mounted in said tape reel mechanism and having a tape guide bearing means through which the leading end of the tape is threaded, said tape arm means extending radially outwardly of said reel and coil of tape and being independently rotatable with respect to said reel, (b) biasing means urging said tape arm means to a first position when the leading end of tape is no longer being pulled from the reel by the tape utilization device, and (c) a coupling means operable by rotational movement of said tape arm means in a first direction in response to a pull on the leading end of the tape by the tape utilization device to couple said tape reel and said tape arm against independent rotation in the first direction so that the force for rotating the reel is applied at said bearing means on said arm means to rotate said tape arm means and said tape reel as a unit.

6. In a tape reel mechanism which includes a stationary shaft and a tape supporting reel freely rotatable about the shaft from which tape may be drawn by a utilization device by applying a force at the point of withdrawal of the tape from a coil thereof on the reel, the combination of (a) a tape guiding arm freely rotatable about the shaft and having a tape guide at its free end over which tape withdrawn from the reel is directed, (b) means for urging the tape guiding arm to rotate in one direction which is opposite to the direction of tape fed by the utilization device, (c) a double armed friction pawl pivoted intermediate the ends of the tape guiding arm, (d) urging means biasing said double armed friction pawl to rotate in the same direction as the direction of withdrawal of the tape by the utilization device, (e) a brake drum fixed to the reel and positioned to be alternately engaged by the ends of the arms of the pawl, said urging means being disposed to urge the tape guiding arm to interlock with the brake drum when tape is withdrawn by the utilization device at a speed faster than the speed of rotation of the reel whereby an acceleration of the withdrawal of the tape from the reel tends to interlock said tape guiding arm and said reel, and (f) a stationary member for engaging said double armed pawl to force the other arm of the pawl into braking engagement with the brake drum when said tape guiding arm moves in a direction opposite to the direction of the withdrawal of the tape under the action of the means for urging it to rotate in said one direction.

References Cited by the Examiner

UNITED STATES PATENTS

| | | | |
|---|---|---|---|
| 1,182,679 | 5/1916 | Hatton | 242—156.2 |
| 2,462,558 | 2/1949 | Scheuermann et al. | 242—75.43 |
| 2,869,684 | 1/1959 | Tarbuck | 242—75.43 X |
| 2,905,406 | 9/1959 | Falck-Pederson | 242—75.43 |

MERVIN STEIN, *Primary Examiner.*

UNITED STATES PATENT OFFICE
CERTIFICATE OF CORRECTION

Patent No. 3,222,008 December 7, 1965

Alfred Z. Purzycki

It is hereby certified that error appears in the above numbered patent requiring correction and that the said Letters Patent should read as corrected below.

In the grant (only), for "Alfred Z. Purzychi" read -- Alfred Z. Purzycki --; column 5, line 38, for "fractionally" read -- frictionally --.

Signed and sealed this 27th day of September 1966.

(SEAL)
Attest:

ERNEST W. SWIDER
Attesting Officer

EDWARD J. BRENNER
Commissioner of Patents